United States Patent
Sugawara et al.

Patent Number: 5,160,588
Date of Patent: Nov. 3, 1992

[54] PROCESS FOR RECOVERING TELLURIUM FROM COPPER ELECTROLYSIS SLIME

[75] Inventors: Yukio Sugawara, Iwaki; Mineo Hayashi, Ote; Junji Konishi, Tokyo; Shosaku Hayashi, Iwaki, all of Japan

[73] Assignees: Mitsubishi Materials Corporation; Onahama Smelting and Refining Company, Ltd., both of Tokyo, Japan

[21] Appl. No.: 444,676

[22] Filed: Dec. 1, 1989

[51] Int. Cl.⁵ .............................. C25C 1/22
[52] U.S. Cl. ...................... 204/109; 204/86; 204/105 R; 204/DIG. 9; 423/508; 423/510
[58] Field of Search ............ 423/509, 510, 508; 204/64 R, 101, 105 R, 106, 108, 149, DIG. 9, 109, 86

[56] References Cited

U.S. PATENT DOCUMENTS

| | | | |
|---|---|---|---|
| 2,981,595 | 4/1961 | Tuwiner et al. | 423/510 |
| 4,047,939 | 9/1977 | Morrison | 423/509 |
| 4,094,668 | 6/1978 | Yannopoulos et al. | 423/509 |
| 4,540,476 | 9/1985 | Dyer | 204/DIG. 9 |

FOREIGN PATENT DOCUMENTS 297584 12/1988 Japan.
079008 3/1989 Japan.

Primary Examiner—John Niebling
Assistant Examiner—Kishor Mayekar
Attorney, Agent, or Firm—Webb, Burden, Ziesenheim & Webb

[57] ABSTRACT

An improved process for recovering tellurium from copper electrolysis slime. The process comprises leaching copper and tellurium from said slime with sulfuric acid and recovering tellurium from the solution after leaching (called "leach") by suspending at least one copper electrode plate in a bath of a leach, allowing tellurium to deposit on the surface thereof as copper telluride, agitating the bath as required so as to remove the copper telluride formed on the surface of the copper plates and allow it to settle, collecting the copper telluride precipitate and obtaining tellurium by means known per se. A high grade copper tellurium precipitate is obtained.

7 Claims, 1 Drawing Sheet

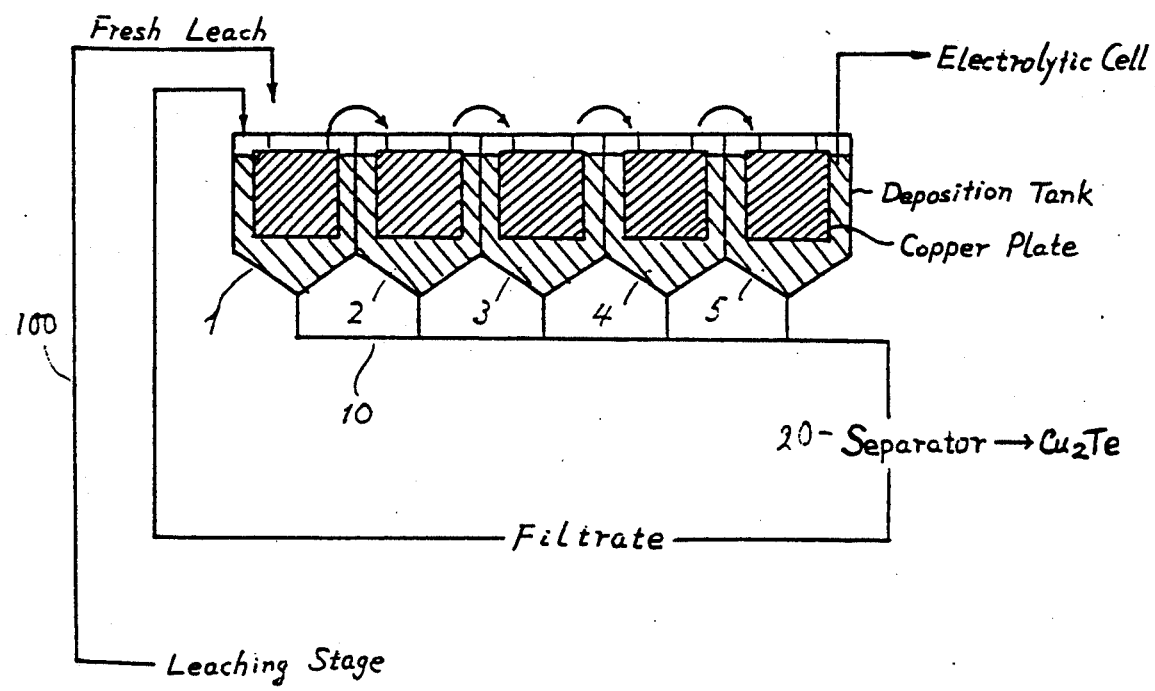

PROCESS FOR RECOVERING TELLURIUM FROM COPPER ELECTROLYSIS SLIME

FIELD OF THE INVENTION

This invention relates to a process for recovering tellurium from copper electrolysis slime. More particularly, this invention relates to an improvement in the process for recovering tellurium from copper electrolysis slime comprising leaching copper and tellurium from said slime with sulfuric acid and recovering tellurium from the solution after leaching (hereinafter, referred to as "leach") as copper telluride.

BACKGROUND OF THE INVENTION

Hithertofore, it has been generally practiced to leach copper from copper electrolysis slime with sulfuric acid when gold, silver, etc. are recovered from said slime. In such leaching, however, tellurium, arsenic, etc. are simultaneously leached. Tellurium adversely affects electrolytic refining and electrowinning of copper and, therefore, the leach (containing tellurium) cannot be returned to the copper electrolysis stage. Thus, tellurium is removed from the leach by decoppering electrolysis in which tellurium, arsenic, etc. are precipitated together with copper or by precipitating tellurium together with arsenic, etc. with the addition of an alkali.

Another practice has been to remove and recover tellurium in the leach as copper telluride by cementation, that is, by addition of copper powder or copper pieces to the leach. When the tellurium content of the slime is high, however, it is difficult to deposit the tellurium with copper pieces because the surface area of the pieces is small. Therefore, copper powder must be used.

In the electrowinning of copper, when copper ores are leached, slight amounts of selenium and tellurium are simultaneously leached. The selenium and tellurium can be removed by passing the leach through a column packed with copper powder or pieces. However, copper powder is not practically used because:

(1) Copper powder is expensive and a considerably excess amount of copper powder is required in order to sufficiently deposit tellurium;

(2) The process is inevitably of batch type and, therefore, large scale equipment is required and the equipment investment is large.

Even if copper powder is used, it is difficult to efficiently recover high grade (not less than 50% tellurium) copper telluride precipitate and to reduce the tellurium content in the solution after deposition to several ppm or less before disposal.

We have found that one cause of slowing of the cementation speed is that the surface of the copper powder or pieces is covered by deposited copper telluride in the course of cementation and found that the problems of the prior art can be overcome by using copper plate instead of copper powder.

DISCLOSURE OF THE INVENTION

This invention provides, in the process for recovering tellurium from copper electrolysis slime comprising leaching copper and tellurium from said slime with sulfuric acid and recovering tellurium from the solution after leaching (hereinafter, referred to as "leach") as copper telluride, and improved process comprising suspending at least one copper plate in a bath of a leach, allowing tellurium to deposit on the surface thereof as copper telluride, agitating the bath as required so as to remove the copper telluride formed on the surface of the copper plates and allow it to settle, collecting the copper telluride and obtaining tellurium from the copper telluride by a means known per se.

In the process of the present invention, tellurium ions in the leach react with copper of the copper plate to form copper telluride and there is no copper powder involved. This means that the grade of the formed copper telluride precipitate is high. That is, the tellurium content in the resulting precipitate is as high as 50% at the very minimum. The remaining leach can be returned to the electrolytic refining stage without having any adverse effect on the resulting electrolytic copper.

In the process of the present invention, attachment of the produced copper telluride to the surface of copper substrates is weak and the copper telluride is easily detached therefrom by light agitation.

In a preferred embodiment of the invention, the agitation is effected by vibrating the copper plates per se.

In a preferred embodiment of the invention, a layer of an inert oily substance such as liquid paraffin, etc. is formed on the surface of the bath of the leach in order to prevent oxidation of copper with dissolved oxygen. Oxidation of copper plate has adverse effect on the formation of copper telluride.

In a preferred embodiment of the invention, alternative electric current is applied to copper plates with one set of copper plates connected with one electrode and another set of copper plate connected with another electrode, the members of the two sets being arranged alternately. In this case, a cycle of dissolution of copper on the surface of the cathodes and deposition of copper telluride on the surface of the anodes is repeated and cathodes and anodes are reversed from cycle to cycle. Such alternate deposition and electrolysis produces vibration and agitation effect. This prevents local increase of copper ion concentration, which inactivates copper electrodes by precipitation of copper sulfate and hinders deposition of formed copper telluride on the copper plate surface. As a result, the required cell voltage is only $\frac{1}{3}-\frac{1}{2}$ that in the case of direct current, although deposition with direct electric current is practically impossible. The usualy employed electric current density is 50–300A/m$^2$.

The copper plates used as deposition substrates can be of blister copper (98% pure) or plates of pyrometallurgically refined copper (called anode copper plates in the trade, 99.8%). Electrolytic copper plates (99.99% pure) can, of course, be used, although it is not necessary.

The invention can be worked in various embodiments. A plurality of deposition baths can be connected in series and the leach can be cascaded by overflowing and the overflow of the last stage can be recycled to the first stage after separation of the precipitate. Thus the leach can be treated continuously.

In the present invention, it is preferred to reduce the tellurium content of the leach in the last stage, that is, the tail to several ppm or less before disposal. This can be confirmed by measuring the redox potential of the last stage leach. That is, if said potential is 200–250mV, the tellurium concentration is in the above-mentioned range. This can be achieved by controlling the flow rate, temperature, agitation condition, etc. In the case of cascading operation, the redox potential of the solution of the last or penultimate stage is measured.

Agitation can be continuously or intermittently effected in various ways, such as vibrating the deposition substrates or providing an agitator or agitators (propellers for instance) in the deposition baths. By these operations, the deposited copper telluride is caused to settle as a powder and fresh surface of the deposition substrates is exposed at all the time. The settled copper telluride powder can be withdrawn batchwise or continuously through the valved outlet at the bottom of each deposition bath.

The process can, if desired, be automatically controlled by means of an automatic process control system, to which the measured redox potential is fed back so that the fresh leach supply rate, bath temperature, agitation condition, etc. are automatically modified.

Tellurium can be obtained from the collected copper telluride by dissolving copper telluride in hydrochloric acid containing hydrogen peroxide and reducing tellurium only by addition of sodium sulfite or bubbling sulfur dioxide gas.

Now the invention will be illustrated by way of working examples with reference to the attached drawing.

BRIEF DESCRIPTION OF THE ATTACHED DRAWING

The sole drawing is a schematic representation of an embodiment of the present invention. Five deposition tanks are connected in a cascading relation.

SPECIFIC DESCRIPTION OF THE INVENTION

Electrolytic copper plates 25 usually have a size of 1m × 1m. Usually about 20 plates hung from a cross bar are used for each deposition tank. So-called anode copper plates (99.8% pure) can be used as good as electrolytic copper plates (99.99% pure).

In the cascading process, usually 4–8 tanks are connected in series. In the attached drawing, 5 tanks are used. A fresh leach 30 is supplied to tank 1 via a conduit 100 from the leaching stage. The leach is transferred by overflowing from tank 1 to tank 5. Each tank has an outlet with a valve at the bottom and is communicated to a common conduit 10. The leaches after deposition in the respective tanks are taken out through said outlets, combined and subjected to solid-liquid separation in a separator 20 and the fitrate is returned to the first tank 1.

Each tank is provided with an agitator which stirs the leach or a vibrator which vibrates the copper plates so as to remove the deposited copper telluride from the substrates and allow it to settle.

The agitation or vibration can be effected intermittently or continuously.

Alternating current 35 is supplied to plates 25 via electrodes 40 and 45, said plates causing dissolution of copper at the negative plate and deposition of copper at the positive plate, the cathodes and anodes being reversed from cycle to cycle, such that alternate deposition and electrolysis produce agitation and vibration which causes the copper telluride to become detached and precipitate, while inactivation of copper plates-/electrodes is prevented and the deposition of formed copper telluride is promoted.

The present invention also includes an apparatus to measure the redox potential 50, which measurement is then fed back to automatic process control system 55 so that the fresh leach supply rate from fresh leach supply 30, the bath temperature, the agitation condition, etc., can be automatically modified.

EXAMPLE 1

Batch Operation

The process of the invention was carried out by batch operation with one deposition tank provided with 19 electrolytic copper plates using a leach, of which the composition, volume and temperature were as follows:

| Composition | |
|---|---|
| Tellurium | 8 g/l |
| Copper | 50 g/l |
| Sulfuric acid | 180 g/l |
| Temperature | 60° C. |
| Volume | 1.5 m$^3$ |

The leach was slowly stirred. The formed copper telluride settled. After 36 hrs, the tellurium content of the leach was reduced to 20 ppm. The amount and composition of the precipitate were as follows.

| Amount | 23 kg |
|---|---|
| Composition | |
| Tellurium | 52% |
| Copper | 47% |

EXAMPLE 2

Four Tank Cascading Operation

The process of the invention was carried out by cascading operation using 19 electrolytic copper plates in each deposition tank. The composition, feed rate and temperature of the leach were as follows.

| Composition | |
|---|---|
| Tellurium | 7.5 g/l |
| Copper | 53 g/l |
| Sulfuric acid | 190 g/l |
| Feed rate | 3 l/min |

The copper plates were vibrated by a vibrator mounted on the cross bars. After 72 hrs, the tellurium content in the tail was 30 ppm. The amount and composition of the collected precipitate were as follows.

| Amount | 264 kg |
|---|---|
| Composition | |
| Tellurium | 53% |
| Copper | 45% |

COMPARATIVE EXAMPLE 1

Batch Operation with Copper Powder

The following leach was treated with copper powder.

| Composition | |
|---|---|
| Tellurium | 14.6 g/l |
| Copper | 65 g/l |
| Sulfuric acid | 196 g/l |
| Temperature | 70° C. |

-continued

| | |
|---|---|
| Volume | 500 ml |

The amount of used copper powder and the results in three separate operations are summarized in the following table.

| | | | |
|---|---|---|---|
| Amount of copper powder added | 7 g | 15 g | 22 g |
| Te content of leach after 12 hr | 4.8 g/l | 1.0 g/l | 0.8 g/l |
| Amount of precipitate | 7.1 g | 14.9 g | 22.8 g |
| Te content of precipitate | 60.3% | 42.5% | 28.7% |
| Cu content of precipitate | 29.0% | 43.9% | 61.4% |

As seen in the table, with a smaller amount of copper powder, recovery of copper telluride is poor although the grade of the obtained precipitate is high. With a larger amount of copper powder, the grade of the precipitate is poor although the recovery is good.

COMPARATIVE EXAMPLE 2

Batch Operation with Copper Powder

The following leach was treated with 25 g of copper powder in four separate runs of different length.

| Composition | |
|---|---|
| Tellurium | 15.8 g/l |
| Copper | 56 g/l |
| Sulfuric acid | 199 g/l |
| Temperature | 70° C. |
| Volume | 500 ml |

The results are summarized in the following table.

| Treating time | 6 hr | 12 hr | 18 hr | 24 hr |
|---|---|---|---|---|
| Te content of treated leach | 0.72 g/l | 0.12 g/l | 0.10 g/l | 0.02 g/l |
| Amount of precipitate | 25 g | 25 g | 24 g | 23 g |
| Te content of precipitate | 28.5% | 32.0% | 32.0% | 32.5% |
| Cu content of precipitate | 59.0% | 62.0% | 57.5% | 60.0% |

As seen in the table, the results are generally poor in comparison with the working examples.

EXAMPLE 3

Batch Operation with Alternate Current Applied

Using the same apparatus as used in Example 1, a leach from the electrolytic copper refining was treated in accordance with the present invention with alternate electric current of a current density of 200 A/m$^2$ applied to the copper plates. The compositions of the leach supplied, the solution after deposition and the settled precipitate were indicated in the following table.

| | Cu | Te | As | Sulfuric Acid |
|---|---|---|---|---|
| Supplied leach | 67.8 g/l | 5.1 g/l | 3.5 g/l | 183.0 g/l |
| Resulting solution | 83.9 g/l | ≦0.1 g/l | 3.6 g/l | 181.0 g/l |
| Precipitate | 52.0% | 46.6% | ≦0.01% | |

COMPARATIVE EXAMPLE 3

Batch Operation without Electric Current

The procedure of Example 3 was repeated without alternate current applied. The results are indicated in the following table.

| | Cu | Te | As | Sulfuric Acid |
|---|---|---|---|---|
| Supplied leach | 67.8 g/l | 5.1 g/l | 3.5 g/l | 183.0 g/l |
| Resulting solution | 83.0 g/l | ≦0.3 g/l | 3.5 g/l | 181.0 g/l |
| Precipitate | 51.5% | 46.5% | ≦0.01% | |

EXAMPLE 4

Batch Operation with Oil Film Cover

The procedure of Example 3 was repeated with liquid paraffine layer covering the bath surface.

| | Cu | Te | As | Sulfuric Acid |
|---|---|---|---|---|
| Supplied leach | 67.8 g/l | 5.1 g/l | 3.5 g/l | 183.0 g/l |
| Resulting solution | 74.3 g/l | ≦0.1 g/l | 3.4 g/l | 182.0 g/l |
| Precipitate | 52.1% | 46.0% | ≦0.01% | |

What we claim is:

1. In the process for recovering tellurium from copper electrolysis slime comprising leaching copper and tellurium from said slime with sulfuric acid and recovering tellurium from the solution containing copper and tellurium sulfate after leaching as copper telluride, an improved process comprising suspending at least one copper electrode plate in a bath of said solution, allowing tellurium to deposit on the surface thereof as copper telluride, agitating the bath as required so as to remove the copper telluride formed on the surface of the copper plate with an alternating electric current and allowing said copper telluride to settle, collecting the copper telluride precipitate, and converting said precipitate to tellurium.

2. The process as recited in claim 1, wherein the agitation is effected by vibrating the copper plates.

3. The process as recited in claim 1, wherein the redox potential of the solution is measured for process control.

4. The process as recited in claim 3, wherein an automatic process control system is provided and the measured redox potential is fed back to said system.

5. The process as recited in claim 1, wherein a layer of an inert oil is formed on the surface of the bath of said solution.

6. The process as recited in claim 1, wherein a plurality of baths of said solution are connected in series through which the solution is overflowed in a cascading operation.

7. The process as recited in claim 1 or 6, wherein the alternating electric current is applied between one set of positively charged copper plates connected with one electrode which causes dissolution of copper and another set of negatively charged copper plates connected with another electrode which causes deposition of copper telluride, the members of the two sets being arranged alternately, and the cathodes and anodes reversed from cycle to cycle, such that alternate deposition and electrolysis produce agitation and vibration which causes the copper telluride to become detached and precipitate, while inactivation of copper electrodes is prevented and the deposition of formed copper telluride is promoted.

* * * * *